June 5, 1951     R. S. BRIGHT     2,556,133
SEAL
Filed April 17, 1948
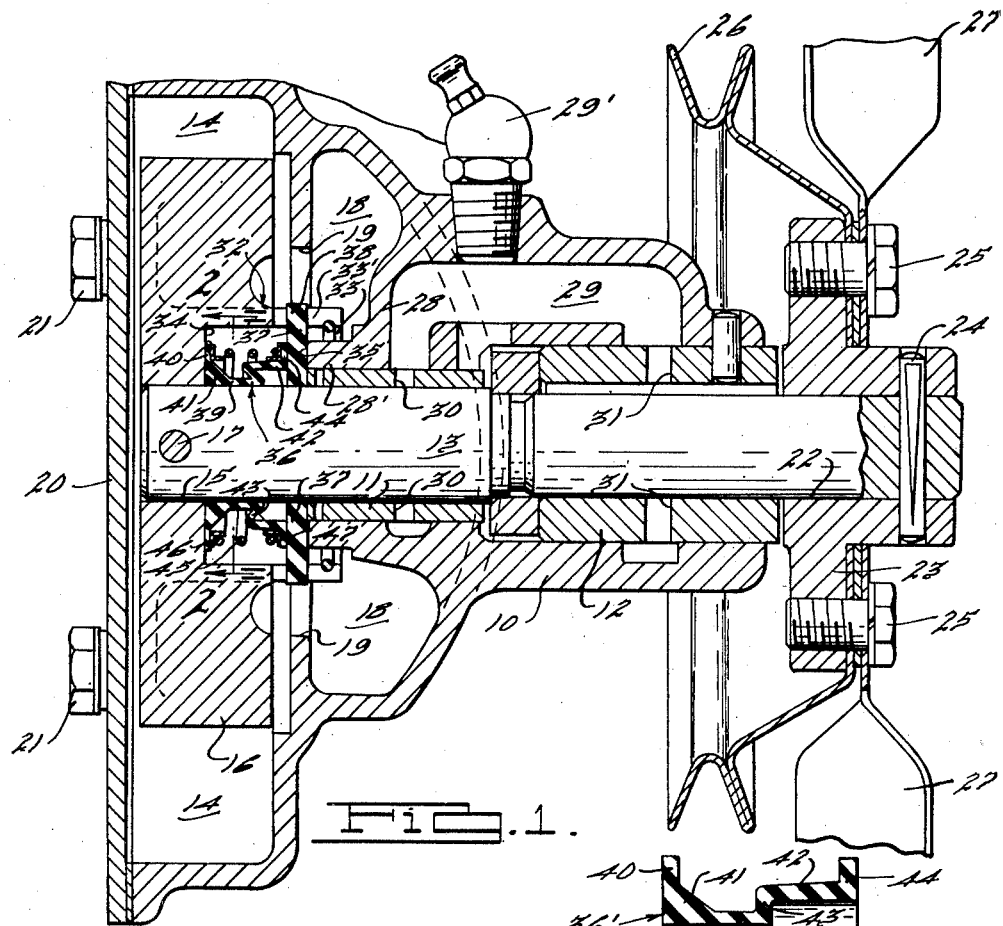
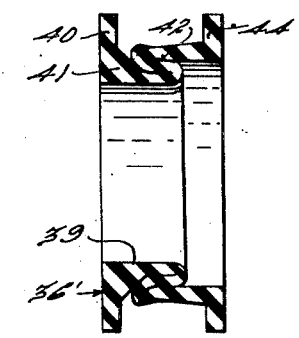
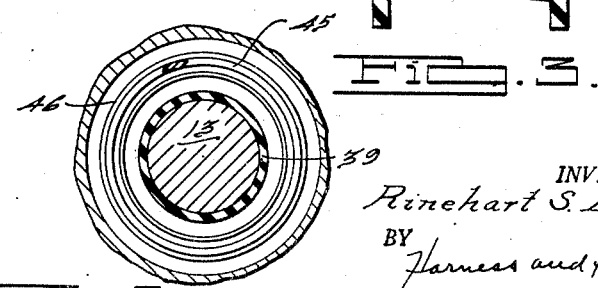
INVENTOR.
Rinehart S. Bright.
BY Harness and Harris
ATTORNEYS.

Patented June 5, 1951

2,556,133

UNITED STATES PATENT OFFICE 2,556,133

SEAL

Rinehart S. Bright, Detroit, Mich., assignor to Chrysler Corporation, Highland Park, Mich., a corporation of Delaware Application April 17, 1948, Serial No. 21,589

4 Claims. (Cl. 286—11)

My invention relates to an improved seal.

More particularly the invention pertains to a seal for preventing leakage around a rotating shaft of a pump or other device in which fluid is contained.

Seals of this character generally comprise an intermediate flexible tubular sleeve portion which surrounds and rotates with the shaft of the device in which it is embodied and spaced end portions, one for sealing contact with a part of the device which rotates with the shaft and the other for sealing contact with a washer-like element which also rotates with the shaft and bears against a stationary housing part of the device. The sealing contact elements of the seal are usually urged apart by a spring which bears against the adjacent sides thereof for maintaining firm engagement of the sealing elements with the respective surface they engage.

It is an object of my invention to provide a flexible seal of this kind which permits a large amount of relative separatory movement between the sealing contact elements thereof to take up for wear of the parts of the device with which the seal cooperates.

Another object of my invention is to provide a stepped intermediate tubular sleeve portion in a seal of this kind which has adjacent sleeve sections of different diameters and differing wall thicknesses predetermined to produce a rolling action of both the adjacent end portions of the sleeve during expansion and contraction of the seal.

Another object of the invention is to provide a frusto-conical portion at the junction of the sleeve section of smaller diameter and the sealing contact element thereof for holding the end of the spring which bears against the latter sealing contact element against displacement transversely of the seal.

Another object of the invention is to provide a frusto-conical portion at this location which is shaped to nest in a recess of corresponding shape that is formed between the overlapped step portion of the seal and the adjacent end portion of the smaller diameter sleeve section when the seal is compressed, in order to avoid limiting of contraction of the seal by engagement of the frusto-conical portion with the step portion.

A further object of the invention is to provide in the sleeve section of large diameter a tapering wall thickness which varies from a minimum adjacent the step portion of the seal and which serves to predetermine the relative amounts of rolling action that takes place in the adjacent end portions of the sleeve sections during contraction of the seal.

Other objects of my invention will become more apparent from the following description taken in connection with the accompanying drawings in which:

Fig. 1 is a sectional view of a conventional water pump embodying my improved seal.

Fig. 2 is a transverse sectional view taken on the line of 2—2 of Fig. 1.

Fig. 3 is a sectional view showing my improved seal in an uncompressed or relaxed position.

Fig. 4 is a sectional view showing my improved seal in contracted state.

In the drawings, I have shown a motor vehicle water pump of a conventional type comprising a housing 10 having bearings 11 and 12 disposed therein in axial alignment. The bearings 11 and 12 have journaled therein a shaft 13, the left extremity of which extends into a portion of the housing 10 which is so constructed as to form a water chamber 14. The left end portion of the shaft 13 is received in an aperture 15 of an impeller 16 which is fixed to the shaft by pin 17 and located within the chamber 14. The chamber 14 is connected by openings 19 with an inlet chamber 18 which serves to receive water to be discharged by the pump. The water enters the chamber 18 through appropriate conduits (not shown), passes through the openings 19 which connect the chambers 14 and 18, into chamber 14 and out of chamber 14 through conduits (not shown). The chamber 14 is closed at one end by plate 20 which is secured to the housing 10 by bolts 21.

The other extremity of the shaft 13 extends outwardly from the bearing 12 to be received within a cylindrical aperture 22 of a hub 23 and is secured therein by pin 24. The hub 23 has secured thereto by cap screws 25, a conventional pulley 26, and fan 27. The pulley 26 is adapted to be driven by the vehicle engine (not shown) to rotate the shaft 13 about its longitudinal axis within the bearings 11 and 12.

The housing 10 is provided with a wall 28 which includes an integral sleeve 28' for receiving the left end portion of the bearing 11. The wall 28 separates the water chamber 18 from a lubricant chamber 29. The innermost extremity of the sleeve 28' and the left end extremity of the bearing 11, as viewed in Fig. 1, join to form a circular abutment 35 which is disposed concentrically with the shaft 13. The chamber 29 is adapted to supply lubricant to the shaft 13 through ports 30 and 31 in bearings 11 and 12, respectively. Suitable lubricant may be delivered to the chamber 29 through a nipple 29' which is disposed within the wall of the housing 10 adjacent the chamber 29. It will be readily seen that provision must be made to prevent leakage of water around the shaft from the chambers 14 and 18 and to maintain proper lubrication of the shaft by shielding the shaft 13 from the water which circulates through the water chamber.

To this end the impeller 16 is provided with an integral cup portion, generally designated by the numeral 32. This portion comprises a cylindrical wall 33 which is concentric with the shaft 13 and has diametrically opposite slots 33' and a closed inner wall 34 which lies in a plane normal to the axis of the shaft. A sealing device, generally designated by the numeral 36, is disposed between the wall 34 and the abutment 35 and serves as a means for preventing the escapement of lubricant from between the shaft 13 and the bearing 11 as well as preventing the entrance of water between the same two components. The sealing device comprises a circular washer 37, preferably comprising resin compound or graphite, positioned around the shaft 13 and having ears 38 adapted to fit the slots 33'. One face of the washer 37 is adapted to engage the abutment 35 in sealing relationship. It may be readily seen that, since the ears 38 of the washer 37 are engaged in the slots 33' of the impeller 16, the washer, although free to shift axially of the shaft 13, will rotate with the impeller and the shaft. Since the abutment 35 is stationary, the washer 37 will rotatably engage the abutment during operation of the pump.

The sealing device 36 further comprises a flexible or rubber-like boot or seal 36', more clearly shown in Fig. 3. This boot 36' comprises a left tubular sleeve section 39, as viewed in the drawing, of circular cross section having an inner diameter which loosely fits upon the shaft 13. Integrally formed on the left extremity of the sleeve section 39 is connected at one extremity a radial flange 40, the end surface of which contacts the bottom wall 34 of the cup 32. The sleeve section 39 is provided at its junction with the flange 40, with a frusto-conical portion 41 of tapered wall thickness, the larger extremity of which is adjacent the flange 40. The other extremity of the sleeve section 39 is connected to one extremity of a larger diameter sleeve section 42 of circular cross section by an outwardly extending step or annular wall 43. The sleeve section 42 has a diameter larger than the diameter of the section 39 and its inner periphery is spaced from the shaft 13. Integrally formed on the right extremity of the sleeve section 42 is a flange 44 which engages the side face of the washer 37 opposite from the abutment 35. The wall thickness of the sleeve portion 42 is tapered, its section of the greater thickness being adjacent the flange 33. This sleeve section 42 is tapered to rigidify it, so that, when the boot 36 is compressed and contracted between the abutment 35 and the wall 34, as more clearly seen in Fig. 1, the section 42 may roll over the section 39 and the section 39 will roll under the sleeve section 42. When this occurs, the small end portion of the frustro-conical portion 41 is received in nested relationship within a part of the larger section 42 as shown in Fig. 4. The relative amounts of rolling actions which take place in the respective sleeve sections 39 and 42 may be established by predetermining the thicknesses of the walls of the sections and the taper of the section 42. An increase in wall thickness of either section decreases the relative amount of rolling section which it undergoes. By employing a tapered thickness in the wall of the section 42, it is possible to employ the outer end of the sleeve 42 to center a spring, hereinafter referred to, without excessively decreasing the rolling action of its inner end.

The washer 37 being in constant rotatable engagement with the abutment 35 is susceptible to wear. In order that the washer 37 may be urged against the abutment 35 so that the space worn away may be gapped to maintain a fluid seal between the washer and the abutment and in order that the flanges 40 and 44 may be retained in fluid sealing engagement with the wall 34 and the washer 37, respectively, the sealing device is provided with a helical spring 45. The spring 45 is disposed concentrically with the boot 36' and is seated in ferrules 46 and 47 which engage the flanges 40 and 44, respectively. The diameter of the larger extremity of the frustro-conical portion is substantially the same as the outer diameter of the sleeve section 42 to accommodate the centering of the spring 45 about the axis of the boot 36'. By centering the spring in this manner, the coils thereof will not engage the boot 36' where the latter is compressed.

As viewed in Fig. 1, both the boot and the spring 45 are under compression between the wall 34 and the washer 37. The large extremity of the frusto-conical portion 41 of the section 39 facilitates the positioning of the ferrule 46 relative to the flange 40 so that the spring 45 will not tilt when compressed. The end of greater thickness of the sleeve section 42 serves to position the ferrule 47 relative to the flange 44 for the same purpose.

Although the sealing device as herein shown and described is employed with a motor vehicle water pump, it may be easily seen that in the broader aspects of any invention the device may be employed with any number of mechanisms.

I claim:

1. A fluid sealing unit adapted to form a seal between two substantially parallel surfaces comprising a rubber-like boot which includes two substantially tubular coaxial sections of different internal diameters having their adjacent ends joined, said sections at their opposed ends each being provided with an outwardly extending integral peripheral flange, each of said peripheral flanges being adapted to engage one of said surfaces, said section of the larger internal diameter being of tapered thickness with the end of greatest thickness being adjacent the flange of the larger diametered section, said section of smaller internal diameter having a substantially cylindrical inner surface and its outer surface tapered to converge axially towards said larger diametered section to provide an integral frusto-conical portion with its larger extremity integral with the flange of said smaller diametered section.

2. A fluid sealing unit adapted to form a seal between two substantially parallel surfaces comprising a rubber-like boot which includes two substantially tubular coaxial sections of different internal diameters having their adjacent ends joined, said sections at their opposed ends each being provided with an outwardly extending integral peripheral flange, each of said peripheral flanges being adapted to engage one of said surfaces, said section of the larger internal diameter being of tapered thickness with the end of greatest thickness being adjacent the flange of the larger diametered section, said section of smaller internal diameter having a substantially cylindrical inner surface and its outer surface tapered to converge axially towards said larger diametered section to provide an integral frusto-conical portion with its larger extremity integral with the flange of said smaller diametered section, and a spring member disposed concentrically with said sections and extending between said flanges adapted to urge said flanges apart to contact said surfaces, said spring member being positioned relative to said sections by said end of greatest thickness of said larger diametered section and by the larger diametered extremity of said frusto-conical portion of said smaller diametered section.

3. A fluid sealing unit adapted to form a seal between two substantially parallel surfaces comprising a rubber-like boot which includes two substantially tubular coaxial sections of different internal diameters having their adjacent ends joined, said sections at their opposed ends each being provided with an outwardly extending integral peripheral flange, each of said peripheral flanges being adapted to engage one of said surfaces, said section of smaller internal diameter having a substantially cylindrical inner surface and its outer surface tapered to converge axially towards said larger diametered section to provide an integral frusto-conical portion with its larger extremity integral with the flange of said smaller diametered section, and a spring member disposed concentrically with said sections and extending between said flanges adapted to urge said flanges apart to contact said surfaces, said spring member being positioned relative to said sections by said larger diametered section and by the larger diametered extremity of said frusto-conical portion of said smaller diametered section.

4. A sealing device for a shaft journaled in a housing comprising the combination of an abutment surface associated with said housing in a plane normal to the axis of said shaft and surrounding the latter, a washer carried by said shaft having a face adapted to engage said surface in fluid sealing relationship, a member rotatable with and normal to said shaft spaced axially from said abutment, and a flexible, fluid sealing unit disposed concentrically with said shaft and adapted to extend between and form a seal between said washer and said abutment member, said fluid sealing unit comprising a rubber-like boot which includes two substantially tubular coaxial sections of different internal diameters having their adjacent ends joined, said sections at their opposed ends each being provided with an outwardly extending integral peripheral flange, each of said peripheral flanges being adapted to engage one of said surfaces, said section of the larger internal diameter being of tapered thickness with the end of greatest thickness being adjacent the flange of the larger diametered section, said section of smaller internal diameter having a substantially cylindrical inner surface and its outer surface tapered to converge axially towards said larger diametered section to provide an integral frusto-conical portion with its larger extremity integral with the flange of said smaller diametered section, and a spring member disposed concentrically with said sections and extending between said flanges adapted to urge said flanges apart to contact said surfaces, said spring member being positioned relative to said sections by said end of greatest thickness of said larger diametered section and by the larger diametered extremity of said frusto-conical portion of said smaller diametered section.

RINEHART S. BRIGHT.

REFERENCES CITED

The following references are of record in the file of this patent:

UNITED STATES PATENTS

| Number | Name | Date |
|---|---|---|
| 2,027,505 | Winkler | Jan. 14, 1936 |
| 2,464,988 | Payne | Mar. 22, 1949 |